(No Model.) 2 Sheets—Sheet 1.
M. P. C. HOOPER.
NETTING CANOPY FOR BEDS, &c.
No. 364,415. Patented June 7, 1887.
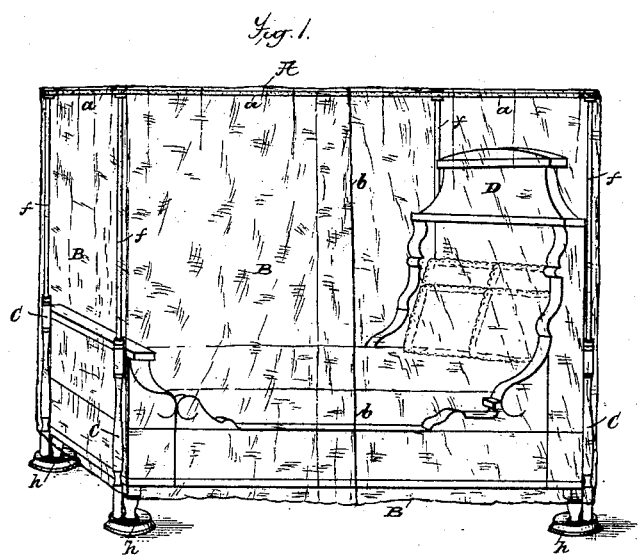
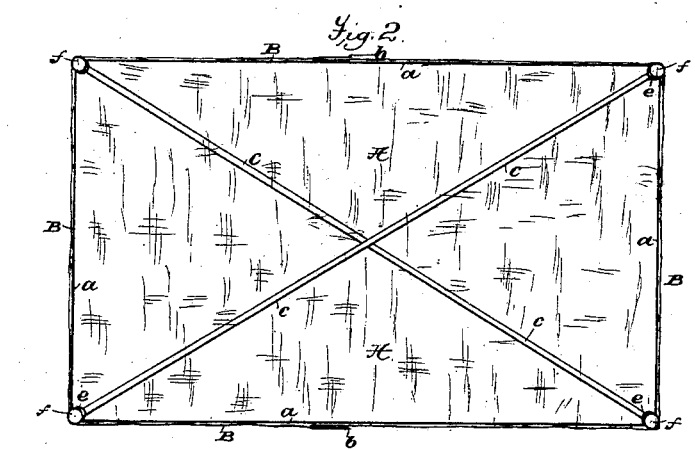
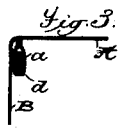
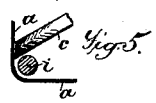
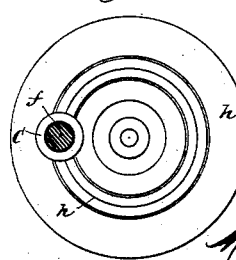
Attest:
Geo. H. Botts.
J. A. Hooey
Inventor:
Mary P. C. Hooper
by Munson & Philipp
Attys.

(No Model.) 2 Sheets—Sheet 2.

M. P. C. HOOPER.
NETTING CANOPY FOR BEDS, &c.

No. 364,415. Patented June 7, 1887.

Attest:
Geo. H. Bitts
J. A. Hoory

Inventor:
Mary P. C. Hooper
by Munson & Phipp
Attys.

UNITED STATES PATENT OFFICE.

MARY P. CARPENTER HOOPER, OF NEW YORK, N. Y.

NETTING CANOPY FOR BEDS, &c.

SPECIFICATION forming part of Letters Patent No. 364,415, dated June 7, 1887.

Application filed July 8, 1885. Serial No. 170,942. (No model.)

*To all whom it may concern:*

Be it known that I, MARY P. CARPENTER HOOPER, a citizen of the United States, residing at New York, county of New York, and State of New York, have invented certain new and useful Improvements in Netting Canopies for Beds, &c., fully described and represented in the following specification and the accompanying drawings, forming a part of the same.

This invention relates to that class of canopies which are made of mosquito-netting and other similar open fabrics and are adapted to be spread over beds, cots, cradles, &c., to protect the occupants from mosquitoes and other annoying insects.

It is the object of the invention to provide a canopy of this class which will be self-adjusting as to size, which can be readily folded into small compass when not in use, so as to occupy but little space in a trunk or traveling-bag, and which can be supported without being connected to the ceiling or walls of the room.

As the invention can be best understood by a detailed description of the construction and manner of using the canopy, such description will now be given, reference being had to the accompanying drawings, in which—

Figure 8:
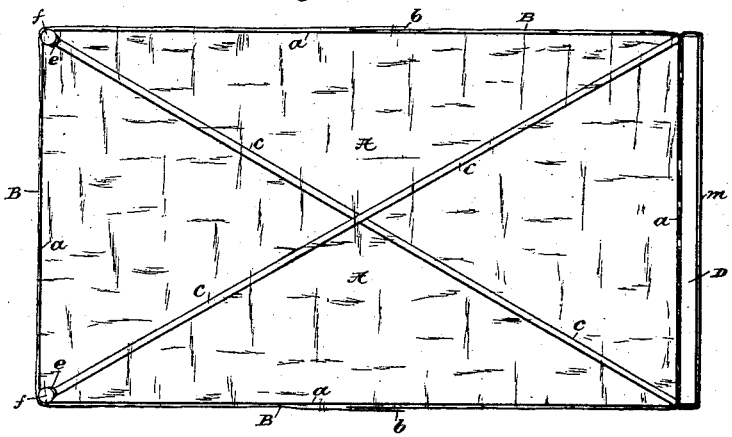

Figure 1 is a perspective view of a bed provided with a canopy constructed and arranged according to the present invention. Fig. 2 is a plan view of the same. Figs. 3, 4, and 5 illustrate details which will be hereinafter referred to. Fig. 6 is an elevation, partly in section, upon an enlarged scale, of one of the standards upon which the canopy is supported. Fig. 7 is a plan view of the base or foot of the standard. Fig. 8 is a plan view, and Fig. 9 a side elevation, of a bed, showing the canopy supported in a different manner.

Referring to said figures, it is to be understood that the canopy therein shown, which is made from mosquito-netting or similar open fabric, consists of a roof portion, A, which is of rectangular or substantially rectangular form, and of a size about equal to the top of the bed, and a wall or side portion, B, which is joined to or made integral with the roof portion and hangs therefrom in the form of a curtain, so as to entirely surround the bed and inclose it within the canopy. The side portion, B, may be slit vertically on one or both sides of the bed, and in such case will be made full, so that when it is allowed to hang free its edges will lap sufficiently to form a tight joint, as shown at $b$, as is common.

The roof portion of the canopy is provided with an elastic band or cord, $a$, which extends entirely around its edges, and is of such length that when the roof portion is distended or stretched flat, as in Fig. 2, the band or cord $a$ will be stretched considerably beyond its normal length and be under considerable tension. The canopy is also provided with two elastic supporting bands or cords, $c$, (see Figs. 2 and 8,) which are located just under the roof portion A, and extend diagonally across the canopy from corner to corner. The bands or cords $c$ are secured at their ends to the band or cord $a$ in any suitable manner, (as, for example, as shown in Fig. 5,) and may or may not be secured along their entire length to the roof portion A, as may be preferred.

The bands or cords $a\ c$ may consist of ordinary elastic webbing or cord, and may be secured to the fabric of which the canopy is composed in any suitable manner. The band or cord $a$ will preferably be drawn through a hem or tuck, $d$, as shown in Fig. 3, while the bands or cords $c$ will preferably be unattached to the canopy except at their ends. These bands or cords $a\ c$, or either of them, may, however, be woven into the fabric, if preferred. These bands or cords may be elastic throughout their entire length, or they may be composed partly of non-elastic material, they being provided with elastic portions or sections. In either case they will be of such length that when the roof portion A is distended or stretched flat they will be stretched considerably beyond their normal length and be under considerable tension.

The canopy thus constructed may be supported in a variety of ways. In many cases it can be supported directly upon the head and foot boards of the bed; but in those cases where the head and foot boards are not of the proper form to afford such support it will preferably be supported upon four standards, C, located at the four corners of the bed, as shown in Fig. 1.

The standards C, which are of sufficient height to raise the roof portion A of the canopy above the head-board D of the bed, are made in two or more parts, $f\ g$, which are so united, as shown in Fig. 6, that they can be readily taken apart and the standards be thus reduced to a convenient length for packing. Each of the standards is provided at its lower end with a small flat foot or base, $h$, to which the part $g$ is screwed or otherwise detachably connected, as shown in Figs. 6 and 7, so that the foot can also be removed for packing.

The manner of using the canopy thus constructed is as follows: The parts $f\ g$ and the feet $h$ of the standards having been put together, as shown in Fig. 6, the feet $h$ will be inserted beneath the legs of the bed, as shown in Fig. 1, so that the weight of the bed will serve to hold the standards firmly in their upright position. The elastic band or cord $a$ is then stretched around the tops of the four standards, as shown in Figs. 1 and 2. This will distend or stretch flat the roof portion A, in which condition it will be held by the band or cord $a$ and the diagonal supporting bands or cords $c$, while the side portion, B, of the canopy will fall in the form of a curtain around the sides and ends of the bed, as shown in Fig. 1, the tension of the band or cord $a$ being sufficient to prevent the portion B from sagging unduly.

The tops of the standards will preferably be provided with grooves, as $i$, for receiving the band or cord $a$, and, if preferred, the band or cord $a$ may be provided at the corners of the roof portion A with elastic loops, as $e$, (see Fig. 4,) to be sprung around the tops of the standards. In such case the ends of the bands or cords $c$ may be attached to the loops $e$, as also shown in said figure; or, if preferred, the loops $e$ may be on the outside of the band $a$, in which case the standards C will be upon the outside of the side or wall portion D of the canopy.

If the head-board B of the bed is of sufficient height and is straight upon its top, the standards may be dispensed with at the head of the bed and the band or cord $a$ stretched around the top of the head-board, and if both the head and foot boards are of suitable height and form to support the band $a$ all of the standards C may be dispensed with.

If it is desired to take the canopy down during the day-time, the parts $f$ of the standards C can be removed, leaving the parts $g$ and the feet $h$ in position. These parts will not injure the appearance of the bed or room, and by leaving them in position the trouble of again putting up the canopy will be materially lessened.

The band $a$ may be stretched around the head and foot boards, even when the foot-board is considerably lower than the head-board, as it will do no harm to have the roof portion of the canopy slant from the head to the foot of the bed.

Figure 9:
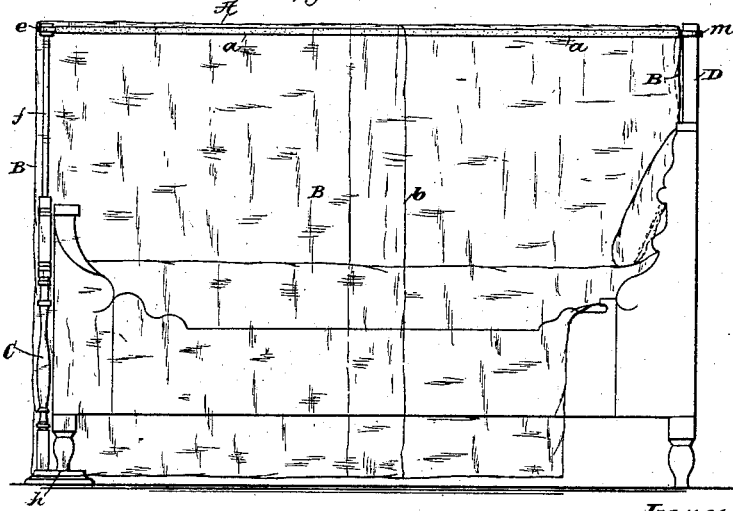

If the head-board of the bed should be so high as to make it undesirable to have the roof portion of the canopy pass over it, or if it should be desired to have the side or wall portion, B, hang upon the inside of the head-board, the end of the canopy at the head of the bed may be provided with a cord or band, as $m$, which is attached to the corners of the canopy and passes around the head-board D, as shown in Figs. 8 and 9. In this case the part of the side portion, B, at the head of the bed will hang down upon the inside of the head-board D, and have its lower edge tucked in back of and under the pillows and bolster. When the portion of the canopy at the head of the bed is supported in this manner, the portion at the foot of the bed may be supported upon two of the standards, as shown in Figs. 8 and 9; or, if the foot-board of the bed is of suitable form, the portion of the canopy at the foot of the bed may be provided with a cord or band similar to the band $m$ and be supported in the same manner. It will also, of course, be seen that when the canopy thus constructed is not supported by the head and foot boards of the bed it may be supported by standards which are permanently secured to the bedstead, or by standards arranged in any convenient or suitable manner. The construction for the standards which is shown in the present case is, however, preferable. These standards may, however, be modified somewhat without departing from their essential features. The feet $h$ may be made in two parts, which will be hinged together so that they can be folded for packing, if desired, and the feet, instead of being inserted beneath the legs of the bed to hold the standards in an upright position against the weight of the canopy, may be inserted beneath any other article of furniture. It is also to be remarked that the standards thus constructed will be found useful for supporting canopies which are of different constructions from that shown in the present case.

A canopy constructed in the manner shown in the present case can be quickly and easily put up and taken down, and can be packed in a very small compass when desired. It can be readily put up over any ordinary bed or cot without any attachment to the walls or ceiling of the room, and it is therefore well adapted for use in hospitals, and it being supported both lengthwise and widthwise by the flexible elastic cord, instead of by rigid bars, it meets the wants of travelers or of persons staying temporarily at hotels or summer boarding-houses. By supporting the canopy both along its sides and across its ends by the elastic cord or band it is made self-adjusting in both directions, so as to conform itself to the size of the bed both lengthwise and widthwise.

It will of course be seen that a canopy thus constructed can be applied to a cradle, crib, lounge, chair, and the like equally as well as to ordinary beds or cots.

What I claim is—

1. The herein-described canopy for beds, &c., consisting of the roof portion A, the side or wall portions, B, and the elastic band or cord $a$, joined or attached to the canopy, and extending entirely around the canopy at the junction of the roof and side portions, and forming a support for the canopy both along the sides and across the ends, whereby the canopy is made self-adjusting both in length and width to conform to the length and width of the bed, substantially as described.

2. The herein-described canopy for beds, &c., consisting of the roof portion A, the side or wall portions, B, the elastic cord or band $a$, joined or attached to the canopy and extending entirely around the canopy at the junction of the roof and side portions, and forming a support for the canopy both along its sides and across its ends, whereby the canopy is made self-adjusting both in length and width, to conform to the length and width of the bed, and the elastic bands or cords $c$, extending diagonally across the roof portion from corner to corner, to prevent the roof portion from sagging, substantially as described.

3. The herein-described canopy for beds, &c., consisting of the roof portion A and side portions, B, and having the elastic cord or band $a$, extending entirely around the canopy at the junction of the roof and side portions, whereby the canopy is made self-adjusting both in length and width to conform to the length and width of the bed, and the cord or band $m$, attached to the corners of the roof portion upon the outside of the canopy, substantially as described.

4. The herein-described canopy for beds, &c., consisting of the roof portion A and side portions, B, and having the elastic cord or band $a$, extending entirely around the canopy at the junction of the roof and side portions, and the elastic cords or bands $c$, extending across the roof portion from corner to corner, whereby the canopy is made self-adjusting both in length and width to conform to the length and width of the bed, and the cord or band $m$, attached to the corners of the roof portion upon the outside of the canopy, substantially as described.

5. The herein-described canopy-support, consisting of the upright portion C, composed of the detachably-connected portions $f$ $g$, and the detachable base $h$, which is adapted to be inserted beneath the leg of the bed or other article of furniture, substantially as described.

In testimony whereof I have hereunto set my hand in the presence of two subscribing witnesses.

MARY P. CARPENTER HOOPER.

Witnesses:
   JAS. J. KENNEDY,
   JAS. A. HOVEY.